Patented Jan. 4, 1927.

1,613,238

UNITED STATES PATENT OFFICE.

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

METHOD OF TREATING ALUNITE.

No Drawing. Application filed June 9, 1924. Serial No. 718,799.

My invention pertains to improvements in the known and practised methods or processes of treating alunite and aims to provide a method which results in the recovery of the potash content and also in the production of a desirable, rapid-hardening cement.

In United States Patent 1,136,549, granted April 20th, 1915, to Charles H. MacDowell for improvements in the treatment of alunite and the like, a process is presented whereby potassium sulphate is volatilized from alunite by heating the latter to from 1100° C. to 1600° C., with or without the presence of carbon, the volatilized potash salt being then condensed in any approved or well known way and collected and the aluminous by-product recovered from the furnace in which the operation is carried out.

I have discovered that this process may be advantageously modified with substantially beneficial results, that is to say, if, instead of merely heating the alunite, with or without the presence of carbon, to the required temperatures for the volatilization of the potash, limestone in definite proportion is added to the charge of raw materials, a high alumina (calcium aluminate) cement of desirable properties and with quickly hardening characteristics is formed in the furnace, during the volatilization of the potash salt.

The new process, forming the subject-matter of this patent, therefore, consists in heating together alunite and limestone in the required proportions, with or without carbon, to final temperatures of from approximately 1100° C. to about 1600° C. whereby the potash content of the alunite is to a very large extent volatilized, and subsequently condensed and recovered in any one of many well-known ways, principally as potassium sulphate; while a high alumina (calcium aluminate) cement of well-known very desirable attributes or qualities is discharged from the furnace.

The molecular proportions of lime (CaO) to alumina ($Al_2O_3$) may vary anywhere from $3CaO.Al_2O_3$ to $3CaO.5Al_2O_3$ depending on the properties it is desired to impart to the finished cement, a product of suitable quality being produced when the molecular proportions in the charge is approximately in the neighborhood of $1CaO.1Al_2O_3$.

The operation may be performed or carried out in any appropriate type of furnace in which the required temperatures can be attained, for instance an electric furnace may be used, or a blast or cupola furnace, or a rotary kiln such as is commonly employed in the Portland cement industry.

The charge may be melted down and allowed to flow from the furnace in the form of a slag, or merely clinkered or sintered as is the practice in the Portland cement industry, the latter step being preferable. The discharged material may either be quenched hot in water or allowed to cool slowly.

The conditions in the furnace may be preferably reducing, for in general under reducing conditions or when coal or carbon is used in the charge, the temperature required for effective reaction is somewhat lower than that needed when oxidizing conditions exist. When reducing conditions prevail, the cement usually contains a small residue of sulphides, while under oxidizing conditions, any residual sulphur is present in the form of sulphate.

The silica and iron content of the finished cementitious product may vary within rather wide limits without affecting seriously the cementing quality of the material, but when high-grade alunite and high-grade limestone are used, the finished and ground cement is practically white in color because of the very low iron content, which fact of course enhances the value of the cement very materially. The silica content of the cement in this case is also under ten percent since high-grade alunite does not contain over three percent silica, and high-grade limestone rarely over two percent or three percent silica. Furthermore, the cement may contain residual amounts of potash ($K_2O$) and of sulphur in the form of sulphates or sulphides without materially influencing the desirable properties of the product.

A desirable and preferred method of performing the process is as follows: Alunite of 35 to 37 percent $Al_2O_3$ content and of 8 to 10 percent $K_2O$ content, high-grade limestone and coal or coke in the proportions by weight of 500 parts of alunite, 200 parts of limestone and 25 to 50 parts of bituminous coal or coke are finely ground together and the mixture is then charged into an ordinary Portland cement kiln and burned under reducing conditions at temperatures approximating those ordinarily used in Portland cement practice or slightly lower until the charge is thoroughly clinkered in the hot zone of the kiln, the best results usually being secured at a temperature of about 1300° C. to 1450° C. During this process, the $CO_2$ of the limestone and the water content of the alunite together with a very large part of the $SO_3$ content and the $K_2O$ content of the alunite are driven off. The potash which is volatilized is caught, principally in the form of potassium sulphate, in a Cottrell apparatus or other appliance placed in or attached to the exit flues from the kiln and there recovered in the form of crystals or solution. Any potassium sulphate that may be carried by or condensed in the flue dust may be recovered from the dust by leaching with water or the dust may again be charged into the furnace and the potash volatilized again. The clinker is discharged from the kiln through a cooler as in ordinary Portland cement practice and then ground to the usual fineness prevailing in the cement industry. There results a practically-white, quick-hardening, high-alumina cement of the following approximate analysis:—

| | Per cent. |
|---|---|
| $Al_2O_3$ | 54 |
| CaO | 33 |
| $SiO_2$ | 8 |
| $SO_3$ | 2 |
| $K_2O$ | 1 |
| $Fe_2O_3$ and other oxides | 2 |

Heretofore, the volatilization of potash from a Portland cement mixture has been proposed, the process including the addition to the charge of a potassium-volatilizing agent, such as a halogen compound, for example, cryolite, fluorspar, magnesium chlorid, or preferably calcium chlorid, the charge being fused to complete the volatilization of the potash.

As distinguished from this, the present invention requires the addition of no such volatilizing agent and preferably the charge is not fused.

Before the development of the invention of this patent, no method was known whereby calcium aluminate cement could be made without melting the charge. Such cement has usually heretofore been prepared in electric furnaces or shaft furnaces, although references have been made to the use of a rotary kiln for this purpose, provision always being made, however, for melting the charge.

From the nature of the charge used in my new process, an acceptable high alumina cement may be produced without melting the charge and this is possible primarily by reason of the nature and composition of the materials employed; in fact, it is consequent upon the presence of the potash, sulphate, combined water and carbon dioxide in the charge.

Since there is such a high proportion of volatile compounds in the charge, the clinker, as it proceeds down the kiln, is rendered very porous, due to the volatilization of all these constituents, and the clinker becomes thoroughly heated through by the hot gases making it unnecessary to raise the temperature to the melting point of the mass and thus facilitating the operation of the process materially.

This is a distinctly novel feature in the production of calcium aluminate cement and the clinker is quite different from the hard, dense clinker of the usual Portland cement process.

In ordinary practice, without the production of the porosity specified, it would be necessary to raise the temperature to such an extent, in order to get the interior of the clinker to the necessary temprature, that the outside would melt and the whole mass in the kiln would stick together, making it impossible to use a rotary kiln, or any other kind of furnace, unless the charge were raised to such a temperature that the cement would flow forth in a liquid condition.

Those skilled in this art will readily understand that the details of the process outlined above are not in any way restricted to the precise example described, nor is the composition of the finished cement limited by the above analysis, for it may be well understood that raw materials of poorer quality than those cited in the example may be used in the process, the ratio of lime to alumina may be different, and the elimination of sulphur and potash may not be as complete, without departing in any degree from the spirit and essence of the invention and without the sacrifice of any of its substantial benefits and advantages.

I claim:

1. The method of treating alunite and the like consisting in heating a mixture of alunite and limestone without melting the same at a temperature and for a period of time sufficient to volatilize a large proportion of the potash content of the alunite and to combine the lime of the limestone with the alumina and silica of the alunite to produce a calcium aluminate cement.

2. The method of treating alunite and the like consisting in heating a mixture of approximately 500 parts by weight of alunite and about 200 parts by weight of limestone without melting the same at a temperature and for a period of time sufficient to volatilize a large proportion of the potash content of the alunite and to combine the lime of the limestone with the alumina and silica of the alunite to produce a calcium aluminate cement.

3. The method of treating alunite and the like consisting in heating a mixture of alunite, limestone, and carbon without melting the same at a temperature and for a period of time sufficient to volatilize a large proportion of the potash content of the alunite and to combine the lime of the limestone with the alumina and silica of the alunite to produce a calcium aluminate cement.

4. The method of treating alunite and the like consisting in heating at a temperature of from about 1100° C. to 1600° C., a mixture of approximately 500 parts by weight of alunite, about 200 parts by weight of limestone, and about 25 to 50 parts by weight of carbon without melting the same for a period of time sufficient to volatilize a large proportion of the potash content of the alunite and to combine the lime of the limestone with the alumina and silica of the alunite to produce a calcium aluminate cement.

5. The method of treating alunite and the like consisting in heating a mixture of alunite and limestone without melting the same at a temperature and for a period of time sufficient to volatilize a large proportion of the potash content of the alunite and to combine the lime of the limestone with the alumina and silica of the alunite to produce a calcium aluminate cement, and recovering the potash principally in the form of potassium sulphate.

6. The method of treating alunite and the like consisting in heating a mixture of approximately 500 parts by weight of alunite, about 200 parts by weight of limestone, and about 25 to 50 parts by weight of carbon without melting the same at a temperature of from approximately 1100° C. to 1600° C. for a period of time sufficient to volatilize a large proportion of the potash content of the alunite and to combine the lime of the limestone with the alumina and silica of the alunite to produce a calcium aluminate cement, and recovering the potash principally in the form of potassium sulphate.

7. The method of treating alunite and the like consisting in heating a mixture of approximately 500 parts by weight of alunite, about 200 parts by weight of limestone, and about 25 to 50 parts by weight of carbon without melting the same in a rotary-kiln at a temperature of approximately 1100° C. to 1600° C. for a period of time sufficient to volatilize a large proportion of the potash content of the alunite and to combine the lime of the limestone with the alumina and silica of the alunite to produce a calcium aluminate cement, and recovering the potash principally in the form of potassium sulphate in a Cottrell precipitation apparatus.

8. The method of treating alunite and the like consisting in heating under reducing conditions a mixture of alunite and limestone without melting the same at a temperature and for a period of time sufficient to volatilize a large proportion of the potash content of the alunite and to combine the lime of the limestone with the alumina and silica of the alunite to produce a calcium aluminate cement.

In witness whereof I have hereunto set my hand and seal.

HERBERT H. MEYERS. [L. S.]